(12) United States Patent
Yoda et al.

(10) Patent No.: US 11,027,774 B2
(45) Date of Patent: Jun. 8, 2021

(54) ACTUATOR FOR STEERING SYSTEM

(71) Applicant: HITACHI AUTOMOTIVE SYSTEMS, LTD., Hitachinaka (JP)

(72) Inventors: Toshiro Yoda, Higashimatsuyama (JP); Takuya Ishihara, Kumagaya (JP)

(73) Assignee: KNORR-BREMSE STEERING SYSTEM JAPAN LTD., Saitama (JP)

( * ) Notice: Subject to any disclaimer, the term of this patent is extended or adjusted under 35 U.S.C. 154(b) by 307 days.

(21) Appl. No.: 16/314,988

(22) PCT Filed: Mar. 16, 2017

(86) PCT No.: PCT/JP2017/010596
§ 371 (c)(1),
(2) Date: Jan. 3, 2019

(87) PCT Pub. No.: WO2018/008196
PCT Pub. Date: Jan. 11, 2018

(65) Prior Publication Data
US 2019/0308660 A1 Oct. 10, 2019

(30) Foreign Application Priority Data

Jul. 4, 2016 (JP) .............................. JP2016-132528

(51) Int. Cl.
*B62D 5/04* (2006.01)
*B62D 5/06* (2006.01)
*B62D 5/12* (2006.01)

(52) U.S. Cl.
CPC ............... *B62D 5/062* (2013.01); *B62D 5/04* (2013.01); *B62D 5/0409* (2013.01);
(Continued)

(58) Field of Classification Search
CPC . B62D 5/062; B62D 5/06; B62D 5/04; B62D 5/0409; B62D 5/0481; B62D 5/12
See application file for complete search history.

(56) References Cited

U.S. PATENT DOCUMENTS

| | | | |
|---|---|---|---|
| 5,954,152 A * | 9/1999 | Kada ...................... | B62D 5/065 180/422 |
| 2003/0169003 A1* | 9/2003 | Cao ........................ | B62D 6/008 318/432 |

(Continued)

FOREIGN PATENT DOCUMENTS

| | | |
|---|---|---|
| JP | 2005-306317 A | 11/2005 |
| JP | 2011-063116 A | 3/2011 |

(Continued)

*Primary Examiner* — Kevin Hurley
*Assistant Examiner* — Marlon A Arce
(74) *Attorney, Agent, or Firm* — Foley & Lardner LLP (57) ABSTRACT

Provided is an actuator for a steering system, which can be increased in degree of freedom for design change, regardless of a configuration change of a hydraulic power steering side. The actuator for a steering system comprises a transmission mechanism configured to transmit the rotation of a steering shaft to a steered wheel, a piston disposed in the transmission mechanism, and a pair of pressure chambers configured to generate a force acting to move the piston. The actuator for a steering system is disposed between a hydraulic power steering system, which imparts a steering force to the steered wheel along with the movement of the piston, and a steering wheel. The actuator for a steering system includes an input shaft which is rotatably and axially supported by the housing and disposed in the steering wheel side; an output shaft which is rotatably and axially supported by the housing and disposed in the hydraulic power steering system; a torsion bar connecting the input shaft and the output shaft; a motor rotor disposed around the outer periphery of the output shaft within the housing and configured to rotate integrally with the output shaft; a motor stator disposed around the outer periphery of the motor rotor within the housing; and a rotation angle detecting section disposed within the housing and configured to detect the rotation angles of the input and (Continued)

output shafts or a relative angle of the input and output shafts.

16 Claims, 7 Drawing Sheets

(52) U.S. Cl.
CPC ............ *B62D 5/0481* (2013.01); *B62D 5/06* (2013.01); *B62D 5/12* (2013.01)

(56) References Cited

U.S. PATENT DOCUMENTS

| | | | |
|---|---|---|---|
| 2004/0020708 A1* | 2/2004 | Szabela | B62D 5/092 |
| | | | 180/446 |
| 2007/0017734 A1* | 1/2007 | Sherwin | B62D 5/008 |
| | | | 180/446 |
| 2011/0066327 A1 | 3/2011 | Horiuchi et al. | |
| 2012/0160594 A1* | 6/2012 | Yoda | B62D 5/062 |
| | | | 180/422 |
| 2012/0261209 A1* | 10/2012 | Shiino | B62D 6/10 |
| | | | 180/446 |
| 2014/0345965 A1* | 11/2014 | Ura | B62D 5/30 |
| | | | 180/404 |
| 2015/0298728 A1* | 10/2015 | Yoda | H02K 5/173 |
| | | | 180/422 |
| 2016/0347352 A1 | 12/2016 | Yoda et al. | |
| 2017/0096160 A1* | 4/2017 | Yoda | B62D 5/046 |

FOREIGN PATENT DOCUMENTS

| | | |
|---|---|---|
| JP | 2015-145184 A | 8/2015 |
| WO | WO-2015/141255 A1 | 9/2015 |

* cited by examiner

ACTUATOR FOR STEERING SYSTEM

TECHNICAL FIELD

The invention relates to an actuator for a steering system.

BACKGROUND ART

A technology related to an actuator for a steering system is disclosed in the Patent Literature 1 mentioned below. The Patent Literature 1 discloses a technology of carrying out the steering assist and the automatic steering by imparting torque through a motor to the input shaft of a hydraulic power steering system which uses a hydraulic liquid to impart a steering assist force.

CITATION LIST

Patent Literature

PTL 1: Japanese Unexamined Patent Application Publication (Kokai) No. 2015-145184

SUMMARY OF INVENTION

Technical Problem

The technology disclosed in the Patent Literature 1 uses a single shaft both as a rotary shaft for imparting torque through the motor and as an input shaft of the hydraulic power steering system. When the configuration of the hydraulic power steering side is changed, therefore, that of the motor side also has to be changed. This leads to a low degree of freedom for design change.

The present invention has been made in light of such an issue. The invention aims to provide an actuator for a steering system, which can be increased in degree of freedom for design change, regardless of a configuration change of a hydraulic power steering side.

Solution to Problem

An actuator for a steering system according to one embodiment of the invention comprises a transmission mechanism configured to transmit rotation of a steering shaft to a steered wheel (a wheel to be steered), a piston disposed in the transmission mechanism, and a pair of pressure chambers configured to generate a force acting to move the piston. The actuator for a steering system is disposed between a hydraulic power steering system, which imparts a steering force to the steered wheel along with the movement of the piston, and a steering wheel. The actuator for a steering system includes an input shaft which is rotatably and axially supported by a housing and disposed on a steering wheel side, an output shaft which is rotatably and axially supported by the housing and disposed on a hydraulic power steering system side, a torsion bar connecting the input shaft and the output shaft, a motor rotor disposed around an outer periphery of the output shaft within the housing and configured to rotate integrally with the output shaft, a motor stator disposed around an outer periphery of the motor rotor within the housing, and a rotation angle detecting section disposed within the housing and configured to detect rotation angles of the input and output shafts or a relative angle of the input and output shafts.

The one embodiment of the invention thus increases a degree of freedom for design change of the actuator for a steering system.

DESCRIPTION OF EMBODIMENTS

Embodiment 1

Figure 1:
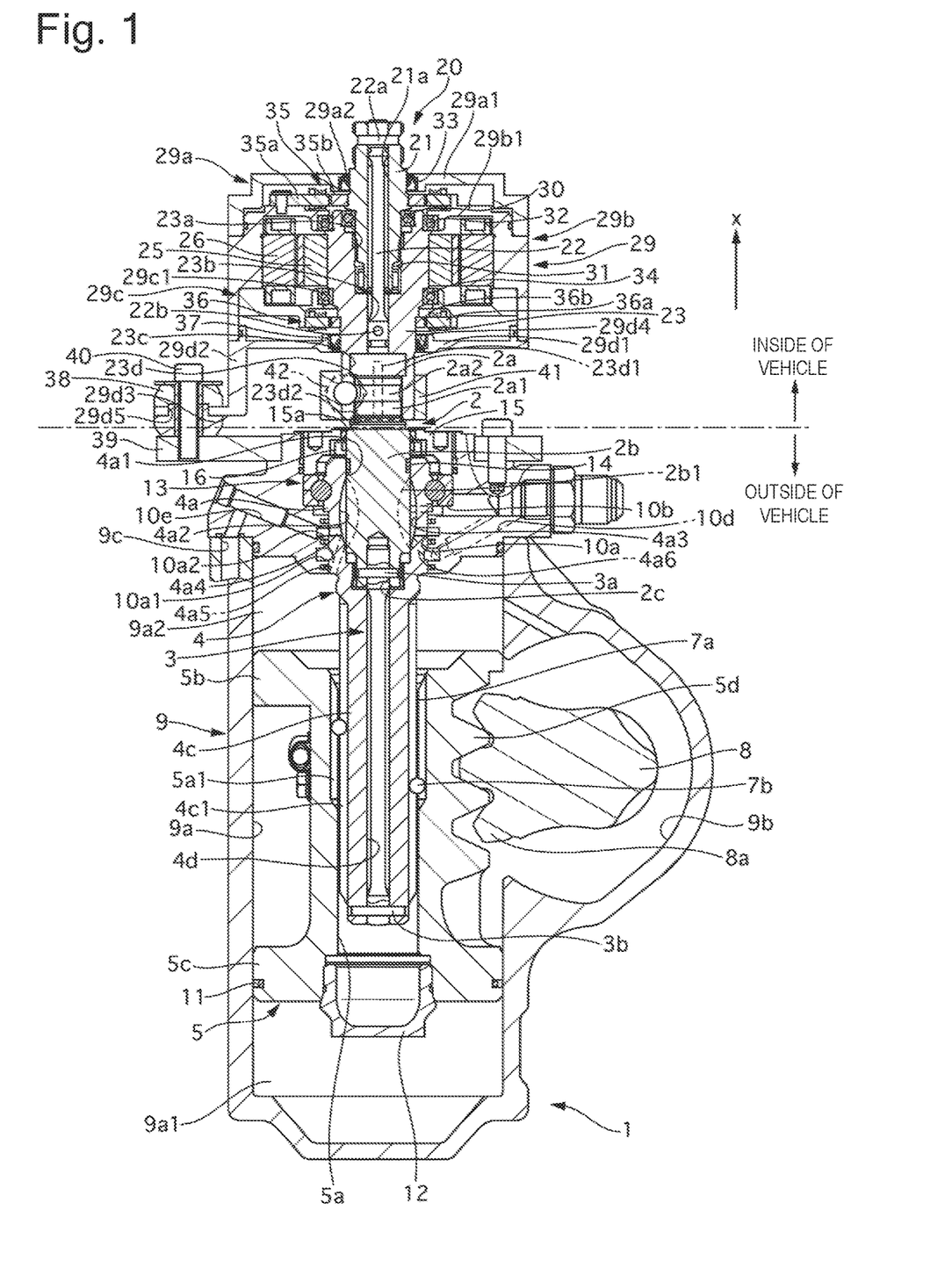
FIG. 1 is a sectional view of a power steering system and an actuator according to an Embodiment 1.

A description will be given below about a configuration of an integrated power steering system (hereinafter, referred to as a power steering system) 1 and that of an actuator 20 for actuating the power steering system 1 according to an Embodiment 1. FIG. 1 is a sectional view of the power steering system 1 and the actuator 20. In FIG. 1, an x-axis represents a direction in which an input shaft 2 extends. A direction toward a steering wheel side of the input shaft 2 (upper side in FIG. 1) is a positive direction.

The power steering system 1 and the actuator 20 are used to assist a steering force for steering by a driver and carry out automatic steering. The power steering system 1 is disposed outside a vehicle interior, whereas the actuator 20 is disposed within the vehicle interior.

[Configuration of the Power Steering System]

The power steering system 1 includes the first input shaft 2, a first torsion bar 3, a first output shaft 4, a piston 5, a control valve 6, a ball screw mechanism 7, a sector gear 8, a steering housing 9, and a valve housing 10.

The first input shaft 2 has an x-axis positive direction-side end portion in which a coupling male portion 2a is formed. A serrated portion 2a1 with serrations is formed in an outer periphery of the coupling male portion 2a. A locking groove 2a2 is formed in the outer periphery of the coupling male portion 2a along the entire circumference. The first input shaft 2 includes a valve rotor portion 2b formed in an x-axis negative direction side of the first input shaft 2. A plurality of switch grooves 2b1 are formed in an outer periphery of the valve rotor portion 2b at predetermined circumferential intervals so as to extend in an x-axis direction. An insertion hole 2c is formed in the first input shaft 2 into a hollow shape to extend from an x-axis negative direction-side end surface in the x-axis positive direction.

A valve body 4a is formed in an x-axis positive direction side of the first output shaft 4. A housing hole 4a1 is formed in the valve body 4a into a hollow shape to extend from an x-axis positive direction-side end surface in the x-axis negative direction. A plurality of first axial grooves 4a2 and second axial grooves 4a3 are formed in an inner peripheral surface of the housing hole 4a1 at predetermined circumferential intervals so as to extend in the x-axis direction.

The valve rotor portion 2b of the first input shaft 2 is inserted in the housing hole 4a1. The first input shaft 2 is supported by a needle bearing 14 in a rotatable manner relative to the first output shaft 4.

The first output shaft 4 is supported by a ball bearing 13 at an x-axis positive side of the valve body 4a in a rotatable manner relative to the valve housing 10.

The valve body 4a includes a first oil passage 4a4, a second oil passage 4a5, and a third oil passage 4a6. These passages bring outer and inner peripheries of the valve body 4a into communication. The first oil passage 4a4 opens into the first axial grooves 4a2 at an inner periphery side thereof. The second oil passage 4a5 opens into the second axial grooves 4a3 at an inner periphery side thereof. An inner periphery side of the third oil passage 4a6 opens into an inner peripheral surface (in which neither the first axial grooves 4a2 nor the second axial grooves 4a3 are formed) of the housing hole 4a1.

The first output shaft 4 includes a threaded portion 4c formed on an x-axis negative side of the valve body 4a. A thread groove 4c1 is cut in an outer periphery of the threaded portion 4c.

A hollow housing hole 4d is formed through the first output shaft 4 to extend from the x-axis negative direction-side end surface to the housing hole 4a1.

The first input shaft 2 and the first output shaft 4 are connected together via the first torsion bar 3. The first torsion bar 3 has an x-axis positive direction-side end portion which is inserted in the insertion hole 2c of the first input shaft 2. The first torsion bar 3 and the first input shaft 2 are connected together through a pin 3a. An x-axis negative direction-side end portion of the first torsion bar 3 is inserted in an x-axis negative direction end portion of the housing hole 4d. The first torsion bar 3 and the first output shaft 4 are connected together through a pin 3b. An axial middle part of the first torsion bar 3 is housed in the housing hole 4d.

The piston 5 is disposed in the threaded portion 4c of the first output shaft 4 so as to be movable in the x-axis direction. The piston 5 is provided with a through-hole 5a which is formed through the piston 5 in the axial direction. A thread groove 5a1 is cut in a part of the inner periphery of the through-hole 5a. The threaded portion 4c of the first output shaft 4 is inserted in the through-hole 5a. A ball 7b is inserted in a threaded hole 7a which is formed of the thread groove 4c1 and a thread groove 5a1. The threaded hole 7a and the ball 7b form a ball screw mechanism 7. The through-hole 5a has an opening portion at an x-axis negative direction side thereof. The opening portion is sealed with a seal member 12.

Formed in an x-axis positive direction side of the piston 5 is a first guide portion 5b. Formed in an x-axis negative direction side of the piston 5 is a second guide portion 5c. Outer peripheral surfaces of the first and second guide portions 5b and 5c are in sliding contact with an inner periphery of a cylinder 9a of the steering housing 9 with the piston 5 inserted in the cylinder 9a. A seal 11 is disposed around the outer periphery of the second guide portion 5c. The seal 11 seals a gap between the outer periphery of the second guide portion 5c and the inner periphery of the cylinder 9a. Racks 5d are formed in an axial middle part of the piston 5.

The sector gear 8 has gear teeth 8a to be engaged with the racks 5d of the piston 5. The sector gear 8 converts an x-axial movement of the piston 5 into a rotational movement and then transmits the rotational movement to a pitman arm which turns a steered wheel. The sector gear 8 is housed in a gear chamber 9b of the steering housing 9.

The steering housing 9 includes the cylinder 9a and the gear chamber 9b. The cylinder 9a is open at an x-axis positive direction side and is closed at an x-axis negative direction side. The cylinder 9a is divided by the piston 5 into a first pressure chamber 9a1 and a second pressure chamber 9a2. An axial oil passage 9c is formed in an outer periphery side of the cylinder 9a of the steering housing 9. The axial oil passage 9c is connected to the first pressure chamber 9a1.

The valve housing 10 seals the x-axis positive direction side of the cylinder 9a of the steering housing 9. The valve housing 10 has a through-hole which axially extends through the valve housing 10. The through-hole includes an oil passage forming portion 10a at an x-axis negative direction side, and a shaft retaining portion 10b at an x-axis positive direction side.

The oil passage forming portion 10a has an inner peripheral surface in which a first circumferential groove 10a1 and a second circumferential groove 10a2 are formed. The first circumferential groove 10a1 and the second circumferential groove 10a2 are formed into grooves extending along the entire circumference of the inner peripheral surface of the oil passage forming portion 10a. The first circumferential groove 10a1 and the second circumferential groove 10a2 are spaced apart from each other in the axial direction. The first circumferential groove 10a1 is formed on an x-axis negative direction side, and the second circumferential groove 10a2 on an x-axis positive direction side. The first circumferential groove 10a1 is disposed in a position where the third oil passage 4a6 opens in an outer periphery of the valve body 4a. The second circumferential groove 10a2 is disposed in a position where the first oil passage 4a4 opens in the outer periphery of the valve body 4a.

Formed in the valve housing 10 is a suction port, not shown. The suction port is connected with a discharge side of an oil pump and supplied with hydraulic fluid. A first oil passage 10d is formed in the valve housing 10. The first oil passage 10d brings the suction port and the first circumferential groove 10a1 into communication with each other. A second oil passage 10e is formed in the valve housing 10. The second oil passage 10e brings the axial oil passage 9c of the steering housing 9 and the second circumferential groove 10a2 into communication with each other.

The ball bearing 13 is housed in the shaft retaining portion 10b. The first output shaft 4 is supported by the ball bearing 13 in a rotatable manner relative to the valve housing 10.

The shaft retaining portion 10b has an opening portion at an x-axis positive direction side. The opening portion is closed with a lid member 15. The lid member 15 is provided with a through-hole 15a which is formed through the lid member 15 in the axial direction. The first input shaft 2 extends through the through-hole 15a. Disposed in the through-hole 15a is a seal member 16 which seals a gap between an inner peripheral surface of the through-hole 15a and an outer peripheral surface of the first input shaft 2.

[Configuration of the Actuator]

Figure 2:
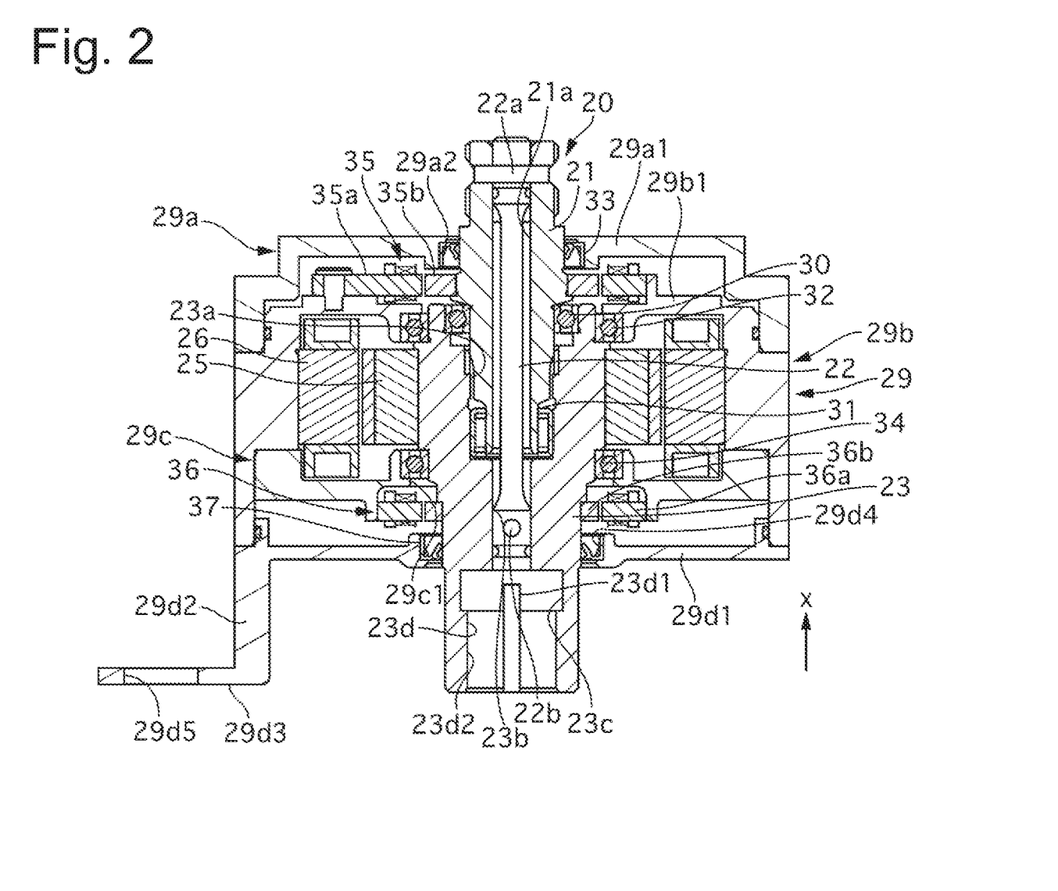
FIG. 2 is a sectional view of the actuator according to the Embodiment 1.
Figure 3:
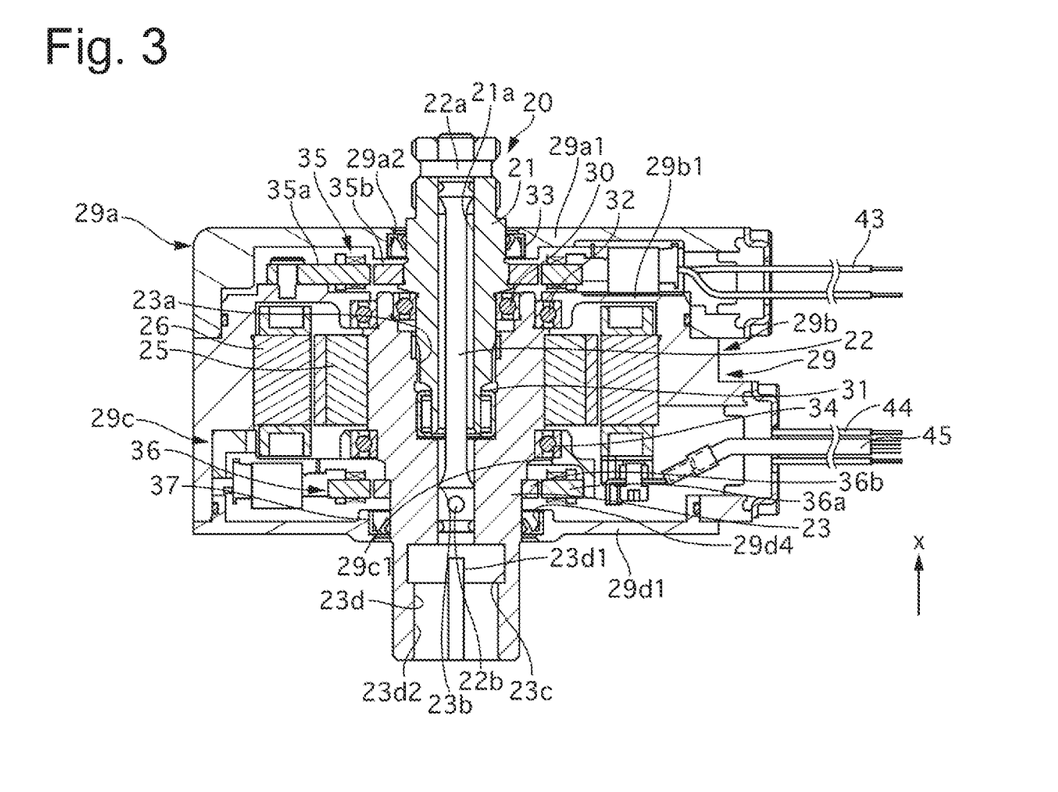
FIG. 3 is a sectional view of the actuator according to the Embodiment 1.

The actuator 20 includes a second input shaft 21, a second torsion bar 22, a second output shaft 23, a motor rotor 25, a motor stator 26, a first resolver 35, a second resolver 36, and a motor housing 29. The actuator 20 is disposed in a steering column connected to the steering wheel. FIGS. 2 and 3 are sectional views of the actuator 20.

The second input shaft 21 is connected to the steering column at an x-axis positive direction side. The second input shaft 21 includes a housing hole 21a which extends through the second input shaft 21 in the axial direction.

A second output shaft 23 is provided with a through-hole which is formed through the second output shaft 23 in the axial direction. The through-hole comprises a first housing hole 23a, a second housing hole 23b, a thin-walled portion 23c, and a coupling female portion 23d arranged in the order mentioned from the x-axis positive direction side.

A part of the second input shaft 21 is housed in the first housing hole 23a. The second input shaft 21 is supported by a ball bearing 30 and a needle bearing 31 in a rotatable manner relative to the second output shaft 23. The ball bearing 30 and the needle bearing 31 are in direct contact with the second input shaft 21 and the second output shaft 23, respectively.

The thin-walled portion 23c is thinner in wall thickness than the second housing hole 23b and the coupling female portion 23d (serrated portion 23d2). A slit portion 23d1 is formed to extend from the thin-walled portion 23c to the coupling female portion 23d. Each of the thin-walled portion 23c and the coupling female portion 23d has a wall with a circumferentially extending portion removed, whereby the slit portion 23d1 has an inner periphery side and an outer periphery side in communication with each other. A serrated portion 23d2 with serrations is formed in an inner peripheral surface of the coupling female portion 23d.

The coupling male portion 2a of the first input shaft 2 is inserted in an inner periphery of the coupling female portion 23d and coupled with the inner periphery of the coupling female portion 23d through serrations.

A band member 41 extends around an outer periphery of the coupling female portion 23d along the entire circumference. The coupling female portion 23d is tightened with the band member 41 using a fastening bolt 42. The coupling female portion 23d is deformed in such a way that an inner diameter thereof is reduced. This makes the second output shaft 23 integrally fixed to the first input shaft 2.

The motor rotor 25 comprising a permanent magnet is disposed in the second output shaft 23 so as to be in direct contact and integrally rotatable with the second output shaft 23.

The second input shaft 21 and the second output shaft 23 are connected together via the second torsion bar 22. The second torsion bar 22 has an x-axis positive direction-side end portion which is inserted in the housing hole 21a of the second input shaft 21. The second torsion bar 22 and the second input shaft 21 are connected together through a pin 22a. An x-axis negative direction side of the second torsion bar 22 is inserted in the second housing hole 23b of the second output shaft 23. The second torsion bar 22 and the second output shaft 23 are connected together through a pin 22b.

The motor housing 29 comprises a first housing 29a, a second housing 29b, a third housing 29c, and a fourth housing 29d arranged in the order mentioned from the x-axis positive direction side.

The second housing 29b is formed into a hollow shape. The motor stator 26 comprising a coil is fixed to an inner periphery side of the second housing 29b. An electric power supply line 45 is disposed in the second housing 29b. The electric power supply line 45 supplies electric power to the motor stator 26.

The second housing 29b is provided with an extending portion 29b1 at an x-axis positive direction side. The extending portion 29b1 extends in a radially inward direction. A ball bearing 32 is disposed in an x-axis negative direction side of a radially inner circumferential end portion of the extending portion 29b1. The second input shaft 21 is supported by the ball bearing 32 in a rotatable manner relative to the second housing 29b. The ball bearing 32 is disposed in a position where the ball bearing 32 overlaps in the x-axis direction with the ball bearing 30 which is disposed in the second output shaft 23.

A first resolver stator 35a is fixed to an x-axis positive direction side of the extending portion 29b1 so as to be in direct contact with the extending portion 29b1. The first resolver stator 35a is radially opposed to a first resolver rotor 35b. The first resolver rotor 35b is rotatable integrally with the second input shaft 21. The first resolver stator 35a and the first resolver rotor 35b form a first resolver sensor 35. The first resolver sensor 35 is placed further on the x-axis positive direction side than the motor rotor 25. The first resolver sensor 35 detects a rotation angle of the second input shaft 21.

The first housing 29a is mounted on the second housing 29b so as to cover an x-axis positive direction-side surface of the second housing 29b. The first housing 29a is formed into a bottomed cup-like shape. Formed in a bottom portion 29a1 of the first housing 29a is a through-hole 29a2 extending through the bottom portion 29a1 in the x-axis direction. The second input shaft 21 is inserted in the through-hole 29a2. The through-hole 29a2 is provided with a seal member 33 which seals a gap between an inner periphery of the through-hole 29a2 and an outer periphery of the second input shaft 21. The first housing 29a is provided with a first output signal line 43 which outputs a signal of the first resolver sensor 35 to the outside. The first housing 29a is provided with a memory section 46. The memory section 46 is a device adapted to store a correction value for correcting a detected signal of the first resolver sensor 35 and correct the detected signal on the basis of the correction value. The first output signal line 43 outputs to the outside the signal corrected by the memory section 46.

The third housing 29c is inserted in the second housing 29b from the x-axis negative direction side. The third housing 29c is formed in the shape like a plate with a through-hole 29c1 extending through the third housing 29c in the x-axis direction. The second output shaft 23 is inserted in the through-hole 29c1. The third housing 29c is provided with a ball bearing 34 at an x-axis positive direction side. The second output shaft is supported by the ball bearing 34 in a rotatable manner relative to the third housing 29c.

A second resolver stator 36a is fixed to an x-axis negative direction side of the third housing 29c so as to be in direct contact with the third housing 29c. The second resolver stator 36a is radially opposed to a second resolver rotor 36b. The second resolver rotor 36b is rotatable integrally with the second output shaft 23. The second resolver stator 36a and the second resolver rotor 36b form a second resolver sensor 36.

The second resolver rotor 36b has a similar shape to the first resolver rotor 35b. The second resolver sensor 36 is placed further on the x-axis negative direction side than the motor rotor 25. The second resolver sensor 36 detects a rotation angle of the second output shaft 23. A relative rotation angle of the second input shaft 21 and the second output shaft 23 can be obtained from the rotation angle of the second input shaft 21, which is detected by the first resolver sensor 35, and the rotation angle of the second output shaft 23, which is detected by the second resolver sensor 36. Driver's steering torque can be detected from the relative rotation angle of the second input shaft 21 and the second output shaft 23. The second resolver sensor 36 outputs a signal to the outside through a second output signal line 44. The second output signal line 44 is disposed in the second housing 29b.

The fourth housing 29*d* includes a plate portion 29*d*1 which closes an opening portion located in the x-axis negative direction side of the second housing 29*b*. The fourth housing 29*d* includes a leg portion 29*d*2 and a flange portion 29*d*3 in a radially outward position of the plate portion 29*d*1. The leg portion 29*d*2 extends in the x-axis negative direction side. The flange portion 29*d*3 extends in a radially outward direction from a tip end of the leg portion 29*d*2.

A through-hole 29*d*4 is formed through the plate portion 29*d*1 in the x-axis direction. The second output shaft 23 is inserted in the through-hole 29*d*4. The through-hole 29*a*4 is provided with a seal member 37 which seals a gap between an inner periphery of the through-hole 29*a*4 and an outer periphery of the second output shaft 23.

A through-hole 29*d*5 is formed through the flange portion 29*d*3 in the x-axis direction. A bush 38 is mounted on the through-hole 29*d*5. The flange portion 29*d*3 is fastened to a flange plate 39 which is mounted on the x-axis positive direction side of the valve housing 10 with a bolt 40 through the bush 38. The bush 38 is formed of an elastic member. The motor housing 29 is elastically supported with respect to the power steering system 1 by the bush 38.

[Operation]

(Steering Force Assist and Automatic Steering)

When the driver turns the steering wheel in such a way that the piston 5 moves toward the first pressure chamber 9*a*1 (in the x-axis negative direction), the hydraulic fluid is supplied from the oil pump to the second pressure chamber 9*a*2 through the control valve 6. To be more specific, the hydraulic fluid discharged from the oil pump passes through the suction port, the first oil passage 10*d*, the first circumferential groove 10*a*1, the third oil passage 4*a*6, the switch grooves 2*b*1, the second axial groove 4*a*3, and the second oil passage 4*a*5 to be supplied into the second pressure chamber 9*a*2. The pressure in the second pressure chamber 9*a*2 is then increased to press the piston 5 toward the first pressure chamber 9*a*1 side. This enables the driver to turn the steering wheel with a small force.

When the driver turns the steering wheel in such a way that the piston 5 moves toward the second pressure chamber 9*a*2 (in the x-axis positive direction), the hydraulic fluid is supplied from the oil pump to the first pressure chamber 9*a*1 through the control valve 6. More specifically, the hydraulic fluid discharged from the oil pump passes through the suction port, the first oil passage 10*d*, the first circumferential groove 10*a*1, the third oil passage 4*a*6, the switch groove 2*b*1, the first axial groove 4*a*2, the first oil passage 4*a*4, the second circumferential groove 10*a*2, the second oil passage 10*e*, and the axial oil passage 9*c* to be supplied into the first pressure chamber 9*a*1. Pressure in the first pressure chamber 9*a*1 is increased to press the piston 5 toward the second pressure chamber 9*a*2 side. This enables the driver to turn the steering wheel with a small force.

(Increase in Degree of Freedom for Design Change)

According to the Embodiment 1, the second input shaft 21 of the actuator 20 and the first input shaft 2 of the power steering system 1 are formed as separate elements. Each of the actuator 20 and the power steering system 1 is thus configured as a single complete device. If the power steering system 1 side is changed in configuration, therefore, the configuration of the actuator 20 side does not have to be changed, which increases the degree of freedom for design change.

(Facilitation of Steering Torque Detection Test)

According to the Embodiment 1, the actuator 20 is provided with the second input shaft 21, the second output shaft 23, and the second torsion bar 22 which is coupled to the second input shaft 21 and the second output shaft 23. The actuator 20 is further provided with the first resolver sensor 35 and the second resolver sensor 36. The first resolver sensor 35 and the second resolver sensor 36 detect the rotation angle of the second input shaft 21 and that of the second output shaft 23, respectively. It is therefore possible to carry out a torque detection test using the actuator 20 alone.

(Improvement of Accuracy in Coaxiality of the Second Input Shaft and the Second Output Shaft)

According to the Embodiment 1, the second input shaft 21 is supported with respect to the second output shaft 23 by the ball bearing 30 which is in direct contact with the second input shaft 21 and the second output shaft 23. If there is a separate member between the second input shaft 21 and the second output shaft 23, this causes a large error in assembly precision of the second input shaft 21 and the second output shaft 23. The Embodiment 1 reduces the error in assembly precision of the second input shaft 21 and the second output shaft 23 since the ball bearing 30 is in direct contact with the second input shaft 21 and the second output shaft 23.

(Downsizing of the Actuator)

According to the Embodiment 1, the ball bearing 30 supports the second input shaft 21 with respect to the second output shaft 23, and the ball bearing 32 supports the second output shaft 23 with respect to the motor housing 29. The ball bearings 30 and 32 are so placed as to overlap with each other in the x-axis direction, which downsizes the actuator 20 in axial dimension.

(Reduction of the Number of Components)

According to the Embodiment 1, the second output shaft 23 is disposed within the motor rotor 25 so as to be in direct contact with the motor rotor 25. The absence of a separate member between the second output shaft 23 and the motor rotor 25 reduces the number of components.

(Restraint of Interference of Resolver Sensors with Magnetic Fields)

According to the Embodiment 1, the first resolver sensor 35 is disposed further on the x-axis positive direction side relative to the motor rotor 25, and the second resolver sensor 36 further on the x-axis negative direction side relative to the motor rotor 25. Since the first resolver sensor 35 and the second resolver sensor 36 are spaced apart from each other, it is possible to restrain the interference of the first and second resolver sensors 35 and 36 with each other's magnetic field.

(Improvement of Accuracy in Detection of Rotation Angles of Resolver Sensors)

According to the Embodiment 1, the first resolver stator 35*a* of the first resolver sensor 35 and the second resolver stator 36*a* of the second resolver sensor 36 are in direct contact with the motor housing 29. This ensures a higher accuracy in installation positions of the first and second resolver stators 35*a* and 36*a*, as compared to when there is a separate member between the first and second resolver stators 35*a* and 36*a* on one hand and the motor housing 29 on the other. This improves the accuracy in detection of rotation angles of the first and second resolver sensors 35 and 36.

(Component Commonality)

According to the Embodiment 1, the first resolver stator 35*a* and the second resolver stator 36*a* have a similar shape. Component commonality is therefore achieved between the first resolver stator 35*a* and the second resolver stator 36*a*.

(Facilitation of Confirmation of Resolver Sensors' Signals)

According to Embodiment 1, the motor housing 29 is provided with the first output signal line 43 for outputting the signal of the first resolver sensor 35 and the second output signal line 44 for outputting the signal of the second resolver sensor 36. The signals of the first and second resolver sensors 35 and 36 therefore can be confirmed outside the motor housing 29. This makes it easy to confirm the signals.

(Incorporation of a Correction Function into the Actuator)

According to the Embodiment 1, the memory section 46 is disposed within the motor housing 29 of the actuator 20. The memory section 46 is adapted to store the correction value of the detected signal of the first resolver sensor 35. The correction value stored in the memory section 46 is used to correct the corrected detected signal of the first resolver sensor 35. The corrected detected signal of the first resolver sensor 35 therefore can be obtained without connection to the power steering system 1 or any other microcomputer.

(Torque Transmission from the Actuator to the Power Steering System)

According to the Embodiment 1, the second output shaft 23 of the actuator 20 is provided with the serrated portion 23d2 which is connected to the first input shaft 2 of the power steering system 1. The torque of the second output shaft 23 of the actuator 20 therefore can be reliably transmitted to the first input shaft 2 of the power steering system 1.

(Reducing of the Need to Change a Design of the Power Steering System)

According to the Embodiment 1, the serrated portion 2a1 is formed in the coupling male portion 2a of the first input shaft 2 of the power steering system 1, and the serrated portion 23d2 in the coupling female portion 23d of the second output shaft 23 of the actuator 20. The x-axis positive direction-side end portion of the first input shaft 2 of the power steering system 1 therefore can be formed in a similar shape to conventional products. This makes it possible to reduce the need to change a design of the power steering system 1 side.

(Improvement in Certainty of Fastening Between the Second Output Shaft and the First Input Shaft)

According to the Embodiment 1, the coupling male portion 2a of the first input shaft 2 inserted in the coupling female portion 23d of the second output shaft 23, where the slit portion 23d1 is formed. The outer periphery of the coupling female portion 23d is then tightened with the band member 41. This makes it possible to reliably fasten the second output shaft 23 and the first input shaft 2 together.

(Improvement of Sealability)

According to the Embodiment 1, the second output shaft 23 is provided with the thin-walled portion 23c between where the seal member 37 is disposed and the coupling female portion 23d (serrated portion 23d2) in the x-axis direction. The thin-walled portion 23c is thinner in wall thickness than the serrated portion 23d2. When the outer periphery of the coupling female portion 23d is tightened with the band member 41, the thin-walled portion 23c is deformed, which restraints a deformation in a region of the second output shaft 23, which is close to where the seal member 37 is located. This ensures the sealability of the seal member 37 with respect to the second output shaft 23.

(Flexibility of Assembling Position of the Housing)

If the motor housing 29 is provided with a high support stiffness with respect to the power steering system 1, a displacement in the assembling position of the motor housing 29 might generate a force acting in such a direction as to incline the first input shaft 2 from the second output shaft 23. In the Embodiment 1, the motor housing 29 is elastically supported with respect to the power steering system 1 by the bush 38 intervening therebetween. This restraints the input of the force which acts in such a direction as to incline the first input shaft 2 from the second output shaft 23. This makes it possible to restrain a deterioration in performance of the control valve 6 of the power steering system 1.

(Improvement of Installability into a Vehicle)

There is limited space under a vehicle interior floor of a vehicle. According to the Embodiment 1, the actuator 20 is placed within the vehicle interior, whereas the power steering system 1 is placed outside the vehicle interior. This makes it possible to install the actuator 20 and the power steering system 1 in the vehicle where the space under the vehicle interior floor is limited, and thus improve installability into a vehicle.

The actuator 20 is disposed in the steering column which is connected to the steering wheel. The actuator 20 therefore can be installed in the vehicle interior of a vehicle which has limited legroom within the vehicle interior, and thus improve installability into a vehicle.

Advantageous Effects (1) The actuator 20 (actuator for a steering system) comprises the steering shaft configured to rotate with the rotation of the steering wheel, the sector gear 8 (transmission mechanism) configured to transmit the rotation of the steering shaft to the steered wheel, the piston 5 disposed in the transmission mechanism, and a pair of pressure chambers (first pressure chamber 9a1, second pressure chamber 9a2) configured to generate a force acting to move the piston 5, the actuator 20 being disposed between the power steering system 1 (hydraulic power steering system), which imparts the steering force to the steered wheel along with the movement of the piston 5, and the steering wheel. The actuator 20 includes the motor housing 29 (housing), the second input shaft 21 (input shaft) which is rotatably and axially supported by the motor housing 29 and disposed on the steering wheel side, the second output shaft 23 (output shaft) which is rotatably and axially supported by the motor housing 29 and disposed on the power steering system 1 side, the second torsion bar 22 (torsion bar) connecting the second input shaft 21 and the second output shaft 23, the motor rotor 25 disposed around the outer periphery of the second output shaft 23 within the motor housing 29 and configured to rotate integrally with the second output shaft 23, the motor stator 26 disposed around an outer periphery of the motor rotor 25 within the motor housing 29, and the first resolver sensor 35 and the second resolver sensor 36 (rotation angle detecting section) disposed within the motor housing 29 and configured to detect the rotation angles of the second input shaft 21 and the second output shaft 23 or a relative angle of the second input shaft 21 and the second output shaft 23.

If the power steering system 1 side is changed in configuration, the actuator 20 side does not have to be changed in configuration. This improves the degree of freedom for design change. It is also possible to carry out the torque detection test using the actuator 20 alone.

(2) The invention includes the ball bearing 30 (input shaft bearing) which is disposed between the second input shaft 21 and the second output shaft 23 so as to be in direct contact with the second input shaft 21 and the second output shaft 23, the ball bearing 30 being configured to axially support the second input shaft 21 with respect to the second output shaft 23.

This makes it possible to reduce the error in assembly precision of the second input shaft 21 and the second output shaft 23.

(3) The invention includes the ball bearing 32 (output shaft bearing) disposed between the motor housing 29 and the second output shaft 23, the ball bearing 32 being configured to axially support the second output shaft 23 with respect to the motor housing 29. The ball bearing 30 and the ball bearing 32 are so disposed as to overlap with each other in the direction of the rotational axis of the second input shaft 21.

This makes it possible to downsize the actuator 20 in axial dimension.

(4) The second output shaft 23 is disposed within the motor rotor 25 so as to be in direct contact with the motor rotor 25.

The number of components therefore can be reduced.

(5) The invention includes, as the rotation angle detecting section, the first resolver sensor 35 disposed further on the steering wheel side than the motor rotor 25 and configured to detect the rotation angle of the second input shaft 21, and the second resolver sensor 36 disposed further on the actuator 20 side than the motor rotor 25 and configured to detect the rotation angle of the second output shaft 23.

This makes it possible to restrain the interference of the first resolver sensor 35 and the second resolver sensor 36 with each other's magnetic field.

(6) The first resolver sensor 35 includes the first resolver stator 35a which is so disposed as to be in direct contact with the motor housing 29 and the first resolver rotor 35b disposed in the second input shaft 21. The second resolver sensor 36 includes the second resolver stator 36a which is so disposed as to be in direct contact with the motor housing 29 and the second resolver rotor 36b disposed in the second output shaft 23.

This makes it possible to improve the accuracy in detection of rotation angles of the first resolver sensor 35 and the second resolver sensor 36.

(7) The first resolver sensor 35 includes the first resolver stator 35a disposed in the motor housing 29 and the first resolver rotor 35b disposed in the second input shaft 21. The second resolver sensor 36 includes the second resolver stator 36a disposed in the motor housing 29 and having a similar shape to the first resolver stator 35a and the second resolver rotor 36b disposed in the second output shaft 23.

This makes it possible to achieve the component commonality between the first resolver stator 35a and the second resolver stator 36a.

(8) The invention includes the first output signal line 43 and the second output signal line 44 (signal output section) disposed in the motor housing 29 and configured to output the signals detected by the first resolver sensor 35 and the second resolver sensor 36 to the outside of the housing.

This makes it possible to confirm the signals of the first resolver sensor 35 and the second resolver sensor 36 outside the motor housing 29 and thus facilitate the confirmation of the signals.

(9) The invention comprises the memory section 46 disposed in the motor housing 29 and configured to store the correction value for correcting the signals detected by the first resolver sensor 35 and the second resolver sensor 36. The first output signal line 43 outputs the detected signal which is corrected according to the correction value stored in the memory section 46.

This makes it possible to obtain the corrected detected signal of the first resolver sensor 35 when not connected to the power steering system 1 or any other microcomputer.

(10) The second output shaft 23 includes the serrated portion 23d2 which is connected to the first input shaft 2 (rotary shaft member) of the power steering system 1.

The torque of the second output shaft 23 of the actuator 20 therefore can be reliably transmitted to the first input shaft 2 of the power steering system 1.

(11) The rotary shaft member of the power steering system 1 comprises the serrated portion 2a1 (male serration portion). The second output shaft 23 includes the serrated portion 23d2 (female serration portion) engaged with the serrated portion 2a1.

This makes it possible to reduce the need to change a design of the first input shaft 2 of the power steering system 1.

(12) The second output shaft 23 comprises the slit portion 23d1 extending around the rotational axis of the second output shaft 23. The second output shaft 23 is fixed to the first input shaft 2 using the band member 41 disposed around the outer periphery side of the second output shaft 23, with the first input shaft 2 of the power steering system 1 inserted in the second output shaft 23.

The second output shaft 23 and the first input shaft 2 therefore can be reliably fastened together.

(13) The invention comprises the seal member 37 disposed between the motor housing 29 and the second output shaft 23 and configured to seal the gap between the motor housing 29 and the second output shaft 23. The second output shaft 23 includes the thin-walled portion 23c which is disposed between the seal member 37 and the serrated portion 23d2 in the direction of the rotational axis of the second output shaft 23 and formed thinner than the serrated portion 23d2 in wall thickness in the radial direction of the rotational axis of the second output shaft 23.

This ensures the sealability of the seal member 37 with respect to the second output shaft 23.

(14) The invention comprises the bush 38 (elastic support member) disposed between the motor housing 29 and the power steering system 1 and configured to elastically support the motor housing 29 with respect to the power steering system 1.

This makes it possible to restrain the input of the force acting in such a direction as to incline the first input shaft 2 from the second output shaft 23.

(15) The actuator 20 is disposed within the vehicle interior of the vehicle, whereas the power steering system 1 is disposed outside the vehicle interior.

This improves installability into a vehicle.

(16) The actuator 20 is disposed in the steering column which is connected to the steering wheel.

This improves installability into a vehicle.

Embodiment 2

Figure 4:
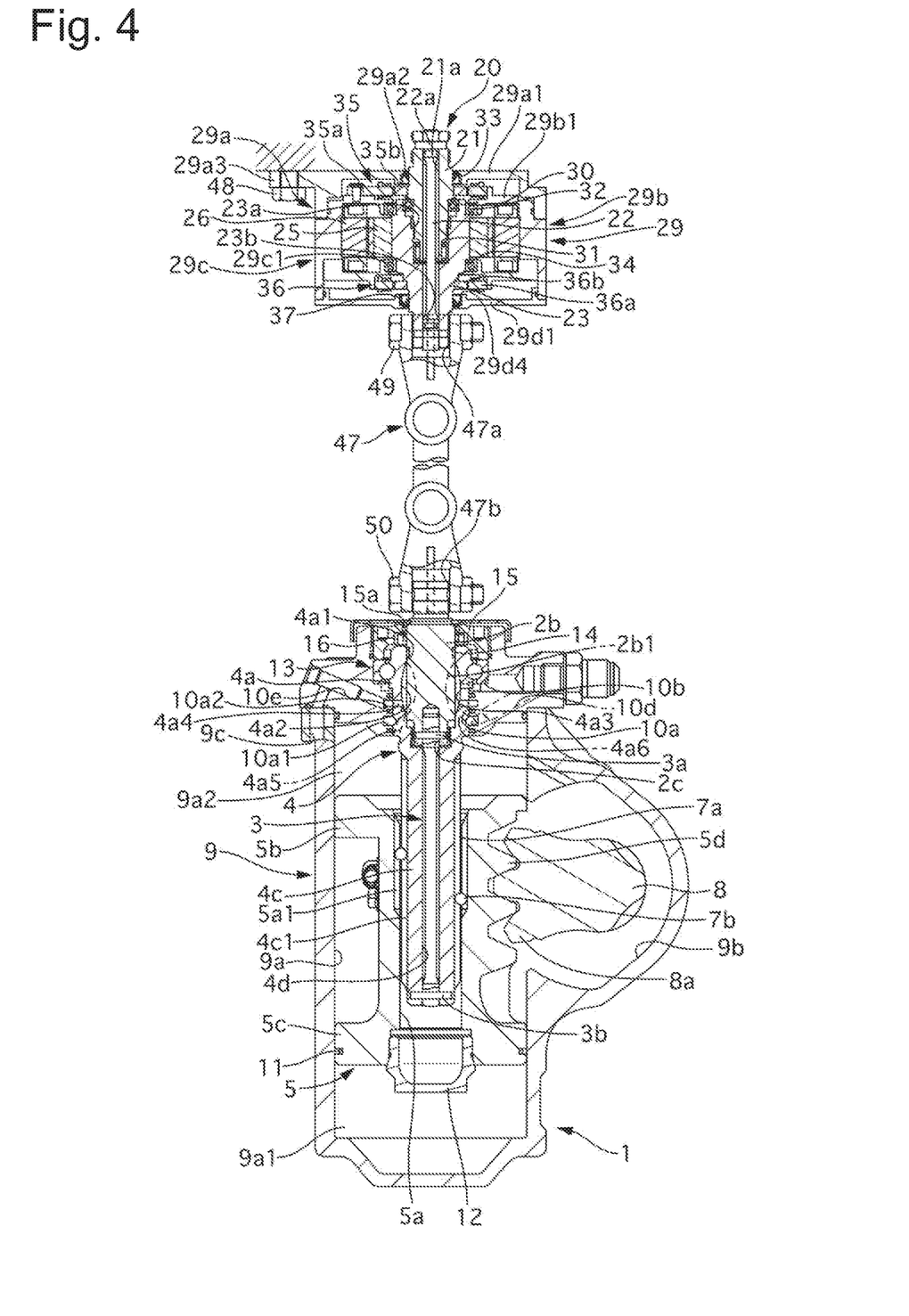
FIG. 4 is a sectional view of a power steering system and an actuator according to an Embodiment 2.

According to the Embodiment 2, a first input shaft 2 of a power steering system 1 and a second output shaft 23 of an actuator 20 are coupled together through a universal joint portion 47.

FIG. 4 is a sectional view of the power steering system 1 and the actuator 20. The power steering system 1 and the actuator 20 of the Embodiment 2 will be discussed below. The same elements as those of the Embodiment 1 will be provided with the same reference signs, and descriptions thereof will be omitted.

The actuator 20 is fixed with a bolt 48 to a flange portion 29*a*3 which is formed in the first housing 29*a* of a motor housing 29 within the vehicle interior.

The actuator 20 includes a second output shaft 23 having an x-axis negative direction-side end portion. The x-axis negative direction-side end portion of the second output shaft 23 is inserted in a first coupling portion 47*a* of an x-axis positive direction-side end portion of the universal joint portion 47 and fastened with a bolt 49. The power steering system 1 includes a first input shaft 2 having an x-axis positive direction-side end portion. The x-axis positive direction-side end portion of the first input shaft 2 is inserted in a second coupling portion 47*b* of the x-axis negative direction-side end portion of the universal joint portion 47 and fastened with a bolt 50.

Advantageous Effect (17) The invention includes the universal joint portion 47 disposed between the second output shaft 23 of the actuator 20 and the first input shaft 2 of the power steering system 1.

This makes it possible to restrain the input of a force acting in such a direction as to incline the first input shaft 2 from the second output shaft 23 and thus restrain a deterioration in performance of a control valve 6 of the power steering system 1.

Other Embodiments

The present invention has been discussed with reference to the Embodiments 1 and 2. The specific configurations of the above-discussed inventions are not limited to the Embodiments 1 and 2. Any design modification or the like is included in the invention as long as it does not depart from the scope of the invention.

Modification of Embodiment 1

Figure 5:
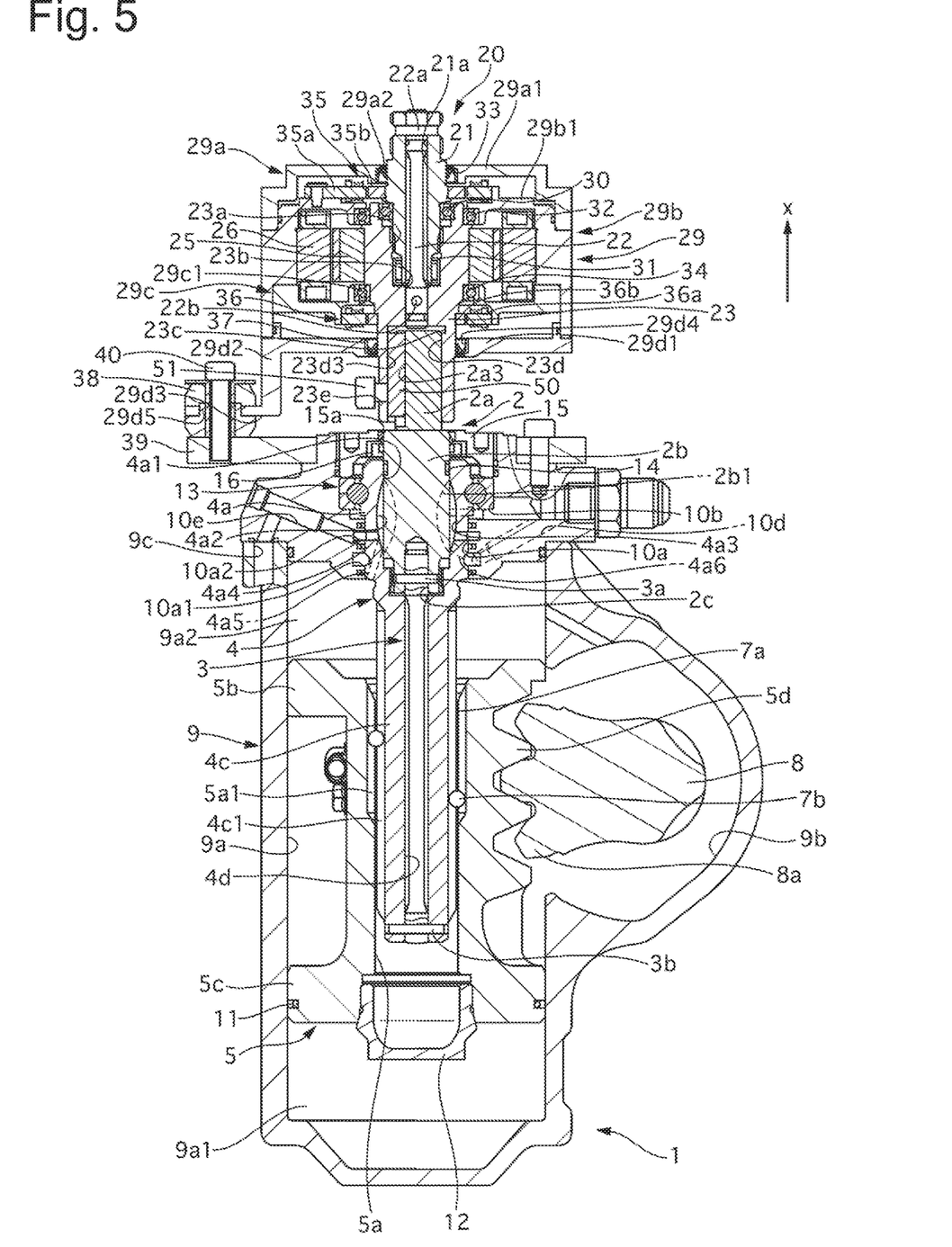
FIG. 5 is a sectional view of a power steering system and an actuator according to another Embodiment 1.

FIG. 5 is a sectional view of a power steering system 1 and an actuator 20. Although, according to the Embodiment 1, the first input shaft 2 of the power steering system 1 and the second output shaft 23 of the actuator 20 are coupled together through serrations, the coupling may be achieved through a key. As illustrated in FIG. 5, a keyway (key seat) 2*a*3 is formed in the outer periphery of the coupling male portion 2*a* of the first input shaft 2. The keyway 2*a*3 has a rectangular cross-section and extends in the axial direction. A keyway 23*d*3 is formed in the outer periphery of the coupling female portion 23*d* of the second output shaft 23. The keyway 23*d*3 has a rectangular cross-section and extends in the axial direction. Inserted in the keyways 2*a*3 and 23*d*3 is a key 50 having a square pole-like shape. A threaded hole 23*e* is formed through the coupling female portion 23*d* of the second output shaft 23 so as to extend from an outer periphery side to an inner periphery side of the coupling female portion 23*d*. A screw 51 is screwed in the threaded hole 23*e* to press the key 50 against the keyway 2*a*3, thereby fastening the first input shaft 2 and the second output shaft 23 together.

Modification of Embodiment 2

Figure 6:
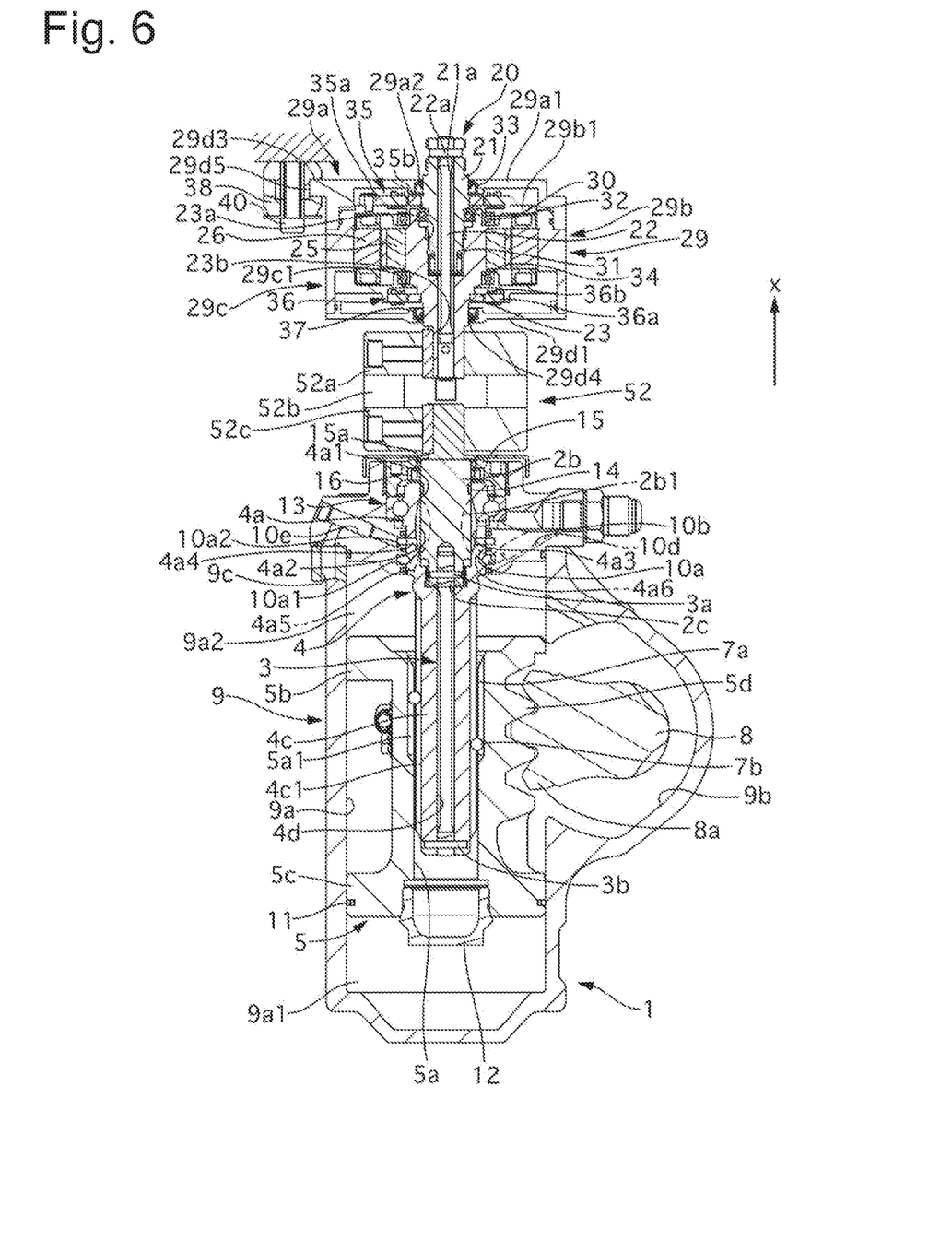
FIG. 6 is a sectional view of a power steering system and an actuator according to another Embodiment 2.

FIG. 6 is a sectional view of a power steering system 1 and an actuator 20. According to the Embodiment 2, the first input shaft 2 of the power steering system 1 and the second output shaft 23 of the actuator 20 are coupled together through the universal joint portion 47. Instead, the coupling may be achieved through a flexible coupling 52. As illustrated in FIG. 6, the flexible coupling 52 includes a first hub 52*a*, a spacer 52*b*, and a second hub 52*c*. The second output shaft 23 has an x-axis negative direction-side end portion which is coupled to the first hub 52*a*. The first input shaft 2 has an x-axis positive direction-side end portion which is coupled to the second hub 52*c*. The spacer 52*b* of the flexible coupling 52 absorbs axial displacement between the first hub 52*a* and the second hub 52*c*, which restraints the input of a force acting in such a direction as to incline the first input shaft 2 from the second output shaft 23. This makes it possible to restrain a deterioration in performance of a control valve 6 of the power steering system 1.

Modification of Embodiment 3

Figure 7:
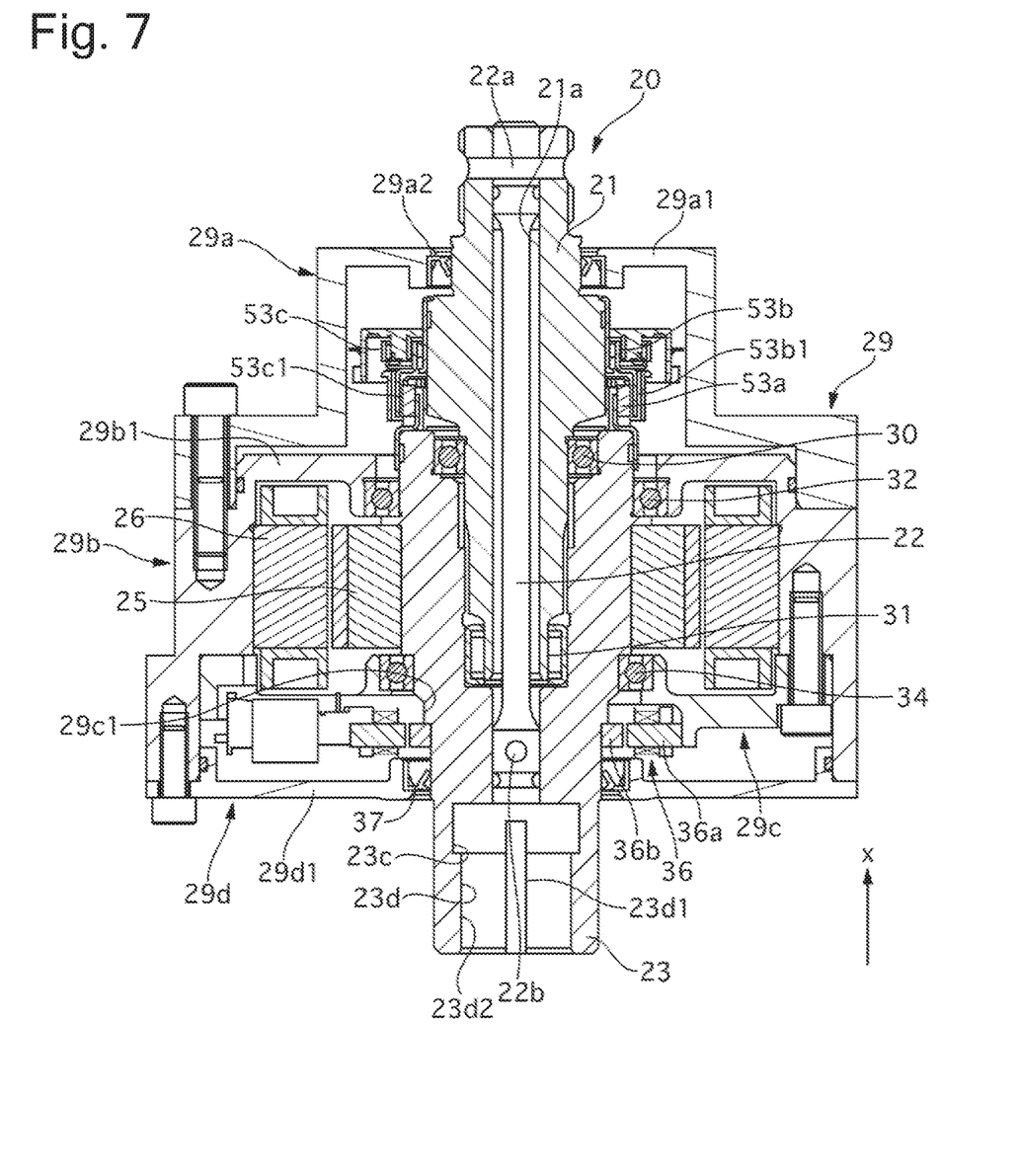
FIG. 7 is a sectional view of an actuator according to another Embodiment 3.

FIG. 7 is a sectional view of an actuator 20. The Embodiments 1 and 2 obtain the relative rotation angle of the second input shaft 21 and the second output shaft 23 from the difference between the rotation angle of the second input shaft 21, which is detected by the first resolver sensor 35, and the rotation angle of the second output shaft 23, which is detected by the second resolver sensor 36, to thereby obtain the steering torque from the relative rotation angle. Instead of such a configuration, a torque sensor 53 may be utilized. The torque sensor 53 uses a Hall element to directly detect a relative rotation angle of the second input shaft 21 and the second output shaft 23 and obtain the steering torque from the relative rotation angle.

The torque sensor 53 will be briefly discussed. The torque sensor 53 includes magnets 53*a*, a first yoke member 53*b*, a second yoke member 53*c*, and the Hall element.

The second output shaft 23 is provided with the magnets 53*a* formed in a ring-like shape as viewed in the axial direction of the second output shaft 23. The magnets 53*a* are so placed that N and S poles are alternately placed in a circumferential direction. The magnets 53*a* comprise, for example, sixteen magnets 53*a* placed on the circumference. The magnets 53*a* rotate integrally with the second output shaft 23.

The second input shaft 21 is provided with the first yoke member 53*b* and the second yoke member 53*c*. The first yoke member 53*b* and the second yoke member 53*c* rotate integrally with the second input shaft 21. The first yoke member 53*b* and the second yoke member 53*c* are made of permanent alloy (soft magnetic alloy). The first yoke member 53*b* and the second yoke member 53*c* are provided with a first claw portion 53*b*1 and a second claw portion 53*c*1, respectively, in such positions that the first and second claw portions 53*b*1 and 53*c*1 face the outer peripheral surfaces of the magnets 53*a*. The first claw portion 53*b*1 comprises, for example, eight first claw portions 53*b*1. Every two circumferentially adjacent first claw portions 53*b*1 are spaced apart from each other. The second claw portion 53*c*1 comprises, for example, eight second claw portions 53*c*1. Every two circumferentially adjacent second claw portions 53*c*1 are spaced apart from each other. Each of the second claw portions 53*c*1 is located between the respective two adjacent first claw portions 53*b*1.

When there is no input of the steering torque, the magnets 53*a* are so placed that each boundary position between the N and S poles is opposed to an area in and around a width-directional center of the first and second claw portions 53*b*1 and 53*c*1. More specifically, without the steering torque input, the N and S poles are equal in terms of area facing the corresponding first claw portion 53*b*1, and the N and S poles are equal in terms of area facing the corresponding second claw portion 53c1. At this point of time, no magnetic flux flows between the first yoke member 53b and the second yoke member 53c.

When the steering toque is inputted, a change occurs in ratio between the N and S poles in terms of area facing the first claw portion 53b1, and in ratio between the N and S poles in terms of area facing the second claw portion 53c1. A magnetic flux then flows between the first yoke member 53b and the second yoke member 53c. The torque sensor 53 detects an amount of the magnetic flux between the first yoke member 53b and the second yoke member 53c by using the Hall element, thus making it possible to obtain the relative rotation angle of the second input shaft 21 and the second output shaft 23 from the magnetic flux amount.

The following is a technical idea which can be understood from the above-described Embodiments.

The actuator for a steering system, which is disposed between the hydraulic power steering system, which imparts the steering force to the steered wheel along with the movement of the piston, and the steering wheel, the actuator comprising the steering shaft configured to rotate with the rotation of the steering wheel, the transmission mechanism configured to transmit the rotation of the steering shaft to the steered wheel, the piston disposed in the transmission mechanism, and the pair of pressure chambers configured to generate the force acting to move the piston, the actuator including the housing, the input shaft which is rotatably and axially supported by the housing and disposed on the steering wheel side, the output shaft which is rotatably and axially supported by the housing and disposed on the hydraulic power steering system side, the torsion bar connecting the input shaft and the output shaft, the motor rotor disposed around the outer periphery of the output shaft within the housing and configured to rotate integrally with the output shaft, the motor stator disposed around the outer periphery of the motor rotor within the housing, and the rotation angle detecting section disposed within the housing and configured to detect the rotation angles of the input and output shafts or the relative angle of the input and output shafts.

Consequently, there is no need to change the configuration of an actuator side for a steering system even if the hydraulic power steering system side is changed in configuration. This increases the degree of freedom for design change. It is also possible to carry out the torque detection test using the actuator alone for a steering system.

A further preferable aspect according to the above-described aspect includes the input shaft bearing which is disposed between the input shaft and the output shaft so as to be in direct contact with the input and output shafts and configured to axially support the input shaft with respect to the output shaft.

This makes it possible to reduce the error in assembly precision of the input and output shafts.

Another preferable aspect according to either one of the above-described aspects includes the output shaft bearing which is disposed between the housing and the output shaft and configured to axially support the output shaft with respect to the housing. The input shaft bearing and the output shaft bearing are so disposed as to overlap with each other in the direction of the rotational axis of the input shaft.

The actuator for a steering system therefore can be downsized in axial dimension.

Still another preferable aspect according to any one of the above-described aspects is configured so that the output shaft is disposed within the motor rotor so as to be in direct contact with the motor rotor.

The number of components therefore can be reduced.

Still another preferable aspect according to any one of the above-described aspects is configured so that the rotation angle detecting section includes the first resolver sensor disposed further on the steering wheel side than the motor rotor and configured to detect the rotation angle of the input shaft, and the second resolver sensor disposed further on the hydraulic actuator side than the motor rotor and configured to detect the rotation angle of the output shaft.

This makes it possible to restrain the interference of the first and second resolver sensors with each other's magnetic field.

Still another preferable aspect according to any one of the above-described aspects is configured so that the first resolver sensor includes the first resolver stator disposed in direct contact with the housing, and the first resolver rotor disposed in the input shaft; and that the second resolver sensor includes the second resolver stator disposed in direct contact with the housing, and the second resolver rotor disposed in the output shaft.

This makes it possible to improve the accuracy in detection of rotation angles of the first and second resolver sensors.

Still another preferable aspect according to any one of the above-described aspects is configured so that the first resolver sensor includes the first resolver stator disposed in the housing, and the first resolver rotor disposed in the input shaft; and that the second resolver sensor includes the second resolver stator disposed in the housing and having a similar shape to the first resolver stator, and the second resolver rotor disposed in the output shaft.

This makes it possible to achieve the component commonality between the first resolver rotor and the second resolver rotor.

Still another preferable aspect according to any one of the above-described aspects includes the signal output section disposed in the housing and configured to output the signal detected by the rotation angle detecting section to the outside of the housing.

This makes it possible to confirm the signal of the rotation angle detecting section outside the housing and thus facilitate the confirmation of the signals.

Still another preferable aspect according to any one of the above-described aspects comprises the memory section disposed within the housing and configured to store the correction value for correcting the signal detected by the rotation angle detecting section. The signal output section outputs the detected signal which is corrected according to the correction value stored in the memory section.

This makes it possible to obtain the corrected detected signal of the rotation angle detecting section without connection to the hydraulic power steering system or any other microcomputer.

Still another preferable aspect according to any one of the above-described aspects is configured so that the output shaft includes the serrated portion which is connected to the rotary shaft member of the hydraulic power steering system.

This makes it possible to reliably transmit the torque of the output shaft of the actuator for a steering system to the rotary shaft member of the hydraulic power steering system.

Still another preferable aspect according to any one of the above-described aspects is configured so that the rotary shaft member of the hydraulic power steering system comprises the male serration portion, and that the output shaft includes the female serration portion engaged with the male serration portion.

This makes it possible to reduce the need to change the design of the rotary shaft member of the hydraulic power steering system.

Still another preferable aspect according to any one of the above-described aspects is configured so that the output shaft comprises the slit portion disposed in the output shaft to extend in the direction around the rotational axis of the output shaft, the output shaft being fixed to the rotary shaft member using the band member disposed around the outer periphery side of the output shaft, with the rotary shaft member of the hydraulic power steering system inserted in the output shaft.

This reliably fastens the output shaft and the rotary shaft member together.

Still another preferable aspect according to any one of the above-described aspects comprises the seal member disposed between the housing and the output shaft and configured to seal the gap between the housing and the output shaft. The output shaft includes the thin-walled portion disposed between the seal member and the female serration portion in the direction of the rotational axis of the output shaft, the thin-walled portion being formed thinner than the female serration portion in wall thickness of the output shaft in the radial direction of the rotational axis of the output shaft.

This ensures the sealability of the seal member with respect to the output shaft.

Still another preferable aspect according to any one of the above-described aspects includes the elastic support member disposed between the housing and the hydraulic power steering system and configured to elastically support the housing with respect to the hydraulic power steering system.

This makes it possible to restrain the input of the force acting in such a direction as to incline the rotary shaft member from the output shaft.

Still another preferable aspect according to any one of the above-described aspects comprises the universal joint portion disposed between the output shaft and the rotary shaft member of the hydraulic power steering system.

This makes it possible to restrain the input of the force acting in such a direction as to incline the rotary shaft member from the output shaft.

Still another preferable aspect according to any one of the above-described aspects is configured so that the actuator for a steering system is disposed in the vehicle interior of the vehicle, whereas the hydraulic power steering system is disposed outside the vehicle interior.

This improves installability into a vehicle.

Still another preferable aspect according to any one of the above-described aspects is configured so that the actuator for a steering system is disposed in the steering column connected to the steering wheel.

This improves installability into a vehicle.

The above descriptions explain only some embodiments of the invention. One skilled in the art should easily understand that the exemplary embodiments may be modified or improved in various ways without materially departing from the novel teachings and advantages of the invention. Accordingly, all such modifications and improvement are intended to be included within the technical scope of the invention. The embodiments may be combined in any way.

The present application claims priority under Japanese Patent Application No. 2016-132528 filed on Jul. 4, 2016. The entire disclosure of Japanese Patent Application No. 2016-132528 filed on Jul. 4, 2016, including the description, claims, drawings and abstract, is incorporated herein by reference in its entirety.

REFERENCE SIGN LIST

1: Power steering system (hydraulic power steering system)
2: First input shaft (rotary shaft member)
2a1: Serrated portion (male serration portion)
5: Piston
8: Sector gear (transmission mechanism)
9a1: First pressure chamber (pressure chamber)
9a2: Second pressure chamber (pressure chamber)
20: Actuator (actuator for a steering system)
21: Second input shaft (input shaft)
22: Second torsion bar (torsion bar)
23: Second output shaft (output shaft)
23c: Thin-walled portion
23d1: Slit portion
23d2: Serrated portion (female serration portion)
25: Motor rotor
26: Motor stator
29: Motor housing (housing)
30: Ball bearing (input shaft bearing)
32: Ball bearing (output shaft bearing)
35: First resolver sensor (rotation angle detecting section)
35a: First resolver stator
35b: First resolver rotor
36: Second resolver sensor (rotation angle detecting section)
36a: Second resolver stator
36b: Second resolver rotor
37: Seal member
38: Bush (elastic support member)
41: Band member
43: First output signal line (signal output section)
44: Second output signal line (signal output section)
46: Memory section
47: Universal joint portion

The invention claimed is:

1. An actuator for a steering system, comprising:
a steering shaft configured to rotate with rotation of a steering wheel;
a transmission mechanism configured to transmit rotation of the steering shaft to a steered wheel;
a piston disposed in the transmission mechanism; and
a pair of pressure chambers configured to generate a force acting to move the piston, the actuator for a steering system being disposed between a hydraulic power steering system which imparts a steering force to the steered wheel along with the movement of the piston, and the steering wheel,
the actuator for a steering system, further including:
a housing;
an input shaft which is rotatably and axially supported by the housing and disposed in a steering wheel side of the housing;
an output shaft which is rotatably and axially supported by the housing and disposed in the hydraulic power steering system side of the housing;
a torsion bar that connects the input shaft and the output shaft;
a motor rotor disposed around an outer periphery of the output shaft within the housing and configured to rotate integrally with the output shaft;
a motor stator disposed around an outer periphery of the motor rotor within the housing;
a rotation angle detecting section disposed within the housing and configured to detect rotation angles of the input and output shafts or a relative angle of the input and output shafts; and an input shaft bearing, the input shaft bearing being disposed between the input shaft and the output shaft so as to be in direct contact with the input and output shafts, the input shaft bearing being configured to axially support the input shaft with respect to the output shaft.

2. The actuator for a steering system according to claim 1, further comprising an output shaft bearing, the output shaft bearing being disposed between the housing and the output shaft, the output shaft bearing being configured to axially support the output shaft with respect to the housing, wherein the input shaft bearing and the output shaft bearing are disposed so as to overlap with each other in a direction of a rotational axis of the input shaft.

3. The actuator for a steering system according to claim 1, wherein the output shaft is disposed within the motor rotor so as to be in direct contact with the motor rotor.

4. The actuator for a steering system according to claim 1, wherein the rotation angle detecting section includes:

a first resolver sensor disposed in the housing so as to be located further on the steering wheel side than the motor rotor, the first resolver sensor being configured to detect a rotation angle of the input shaft, and a second resolver sensor disposed in the housing so as to be located further on the hydraulic actuator side than the motor rotor, the second resolver sensor being configured to detect a rotation angle of the output shaft.

5. The actuator for a steering system according to claim 4, wherein the first resolver sensor includes a first resolver stator disposed in direct contact with the housing, and a first resolver rotor disposed in the input shaft; and the second resolver sensor includes a second resolver stator disposed in direct contact with the housing, and a second resolver rotor disposed in the output shaft.

6. The actuator for a steering system according to claim 4, wherein the first resolver sensor includes a first resolver stator disposed in the housing, and a first resolver rotor disposed in the input shaft; and the second resolver sensor includes a second resolver stator disposed in the housing, and a second resolver rotor disposed in the output shaft and having a similar shape to the first resolver rotor.

7. The actuator for a steering system according to claim 1, further comprising a signal output section, the signal output section being disposed in the housing and configured to output a signal detected by the rotation angle detecting section to the outside of the housing.

8. The actuator for a steering system according to claim 1, the actuator for a steering system being disposed within a vehicle interior of a vehicle, wherein the hydraulic power steering system is disposed outside the vehicle interior.

9. The actuator for a steering system according to claim 8, the actuator for a steering system being disposed in a steering column connected to a steering wheel.

10. An actuator for a steering system, comprising:

a steering shaft configured to rotate with rotation of a steering wheel;

a transmission mechanism configured to transmit rotation of the steering shaft to a steered wheel;

a piston disposed in the transmission mechanism; and a pair of pressure chambers configured to generate a force acting to move the piston, the actuator for a steering system being disposed between a hydraulic power steering system which imparts a steering force to the steered wheel along with the movement of the piston, and the steering wheel, the actuator for a steering system, further including:

a housing;

an input shaft which is rotatably and axially supported by the housing and disposed in a steering wheel side of the housing;

an output shaft which is rotatably and axially supported by the housing and disposed in the hydraulic power steering system side of the housing;

a torsion bar that connects the input shaft and the output shaft;

a motor rotor disposed around an outer periphery of the output shaft within the housing and configured to rotate integrally with the output shaft;

a motor stator disposed around an outer periphery of the motor rotor within the housing;

a rotation angle detecting section disposed within the housing and configured to detect rotation angles of the input and output shafts or a relative angle of the input and output shafts;

a signal output section, the signal output section being disposed in the housing and configured to output a signal detected by the rotation angle detecting section to the outside of the housing; and a memory section disposed within the housing and configured to store a correction value for correcting the signal detected by the rotation angle detecting section, wherein the signal output section is configured to output the detected signal which is corrected according to the correction value stored in the memory section.

11. An actuator for a steering system, comprising:

a steering shaft configured to rotate with rotation of a steering wheel;

a transmission mechanism configured to transmit rotation of the steering shaft to a steered wheel;

a piston disposed in the transmission mechanism; and a pair of pressure chambers configured to generate a force acting to move the piston, the actuator for a steering system being disposed between a hydraulic power steering system which imparts a steering force to the steered wheel along with the movement of the piston, and the steering wheel, the actuator for a steering system, further including:

a housing;

an input shaft which is rotatably and axially supported by the housing and disposed in a steering wheel side of the housing;

an output shaft which is rotatably and axially supported by the housing and disposed in the hydraulic power steering system side of the housing;

a torsion bar that connects the input shaft and the output shaft;

a motor rotor disposed around an outer periphery of the output shaft within the housing and configured to rotate integrally with the output shaft;

a motor stator disposed around an outer periphery of the motor rotor within the housing;

a rotation angle detecting section disposed within the housing and configured to detect rotation angles of the input and output shafts or a relative angle of the input and output shafts,
wherein
the output shaft includes a serrated portion connected to a rotary shaft member of the hydraulic power steering system.

12. The actuator for a steering system according to claim 11, wherein
the rotary shaft member of the hydraulic power steering system comprises a male serration portion; and
the output shaft includes a female serration portion engaged with the male serration portion.

13. The actuator for a steering system according to claim 12, wherein
the output shaft comprises a slit portion extending around a rotational axis of the output shaft; and
the slit portion is fixed to the rotary shaft member using a band member disposed around an outer periphery side of the output shaft, with the rotary shaft member of the hydraulic power steering system inserted in the output shaft.

14. The actuator for a steering system according to claim 13, further comprising a seal member disposed between the housing and the output shaft, the seal member being configured to seal a gap between the housing and the output shaft, wherein
the output shaft includes a thin-walled portion disposed between the seal member and the female serration portion in a direction of the rotational axis of the output shaft, the thin-walled portion being formed thinner than the female serration portion in wall thickness of the output shaft in a radial direction of the rotational axis of the output shaft.

15. An actuator for a steering system, comprising:
a steering shaft configured to rotate with rotation of a steering wheel;
a transmission mechanism configured to transmit rotation of the steering shaft to a steered wheel;
a piston disposed in the transmission mechanism; and
a pair of pressure chambers configured to generate a force acting to move the piston, the actuator for a steering system being disposed between a hydraulic power steering system which imparts a steering force to the steered wheel along with the movement of the piston, and the steering wheel,
the actuator for a steering system, further including:
a housing;
an input shaft which is rotatably and axially supported by the housing and disposed in a steering wheel side of the housing;
an output shaft which is rotatably and axially supported by the housing and disposed in the hydraulic power steering system side of the housing;
a torsion bar that connects the input shaft and the output shaft;
a motor rotor disposed around an outer periphery of the output shaft within the housing and configured to rotate integrally with the output shaft;
a motor stator disposed around an outer periphery of the motor rotor within the housing;
a rotation angle detecting section disposed within the housing and configured to detect rotation angles of the input and output shafts or a relative angle of the input and output shafts; and
an elastic support member disposed between the housing and the hydraulic power steering system, the elastic support member being configured to elastically support the housing with respect to the hydraulic power steering system.

16. An actuator for a steering system, comprising:
a steering shaft configured to rotate with rotation of a steering wheel;
a transmission mechanism configured to transmit rotation of the steering shaft to a steered wheel;
a piston disposed in the transmission mechanism; and
a pair of pressure chambers configured to generate a force acting to move the piston, the actuator for a steering system being disposed between a hydraulic power steering system which imparts a steering force to the steered wheel along with the movement of the piston, and the steering wheel,
the actuator for a steering system, further including:
a housing;
an input shaft which is rotatably and axially supported by the housing and disposed in a steering wheel side of the housing;
an output shaft which is rotatably and axially supported by the housing and disposed in the hydraulic power steering system side of the housing;
a torsion bar that connects the input shaft and the output shaft;
a motor rotor disposed around an outer periphery of the output shaft within the housing and configured to rotate integrally with the output shaft;
a motor stator disposed around an outer periphery of the motor rotor within the housing;
a rotation angle detecting section disposed within the housing and configured to detect rotation angles of the input and output shafts or a relative angle of the input and output shafts; and
a universal joint portion disposed between the output shaft and the rotary shaft member of the hydraulic power steering system.

* * * * *